United States Patent [19]
Safko

[11] Patent Number: 5,184,931
[45] Date of Patent: Feb. 9, 1993

[54] TRUCK CARGO REMOVER

[76] Inventor: John A. Safko, Box 233, Clarksville, Pa. 15322

[21] Appl. No.: 745,696

[22] Filed: Aug. 16, 1991

[51] Int. Cl.⁵ .............................................. B60P 1/00
[52] U.S. Cl. ...................... 414/522; 296/26; 296/39.2; 414/786
[58] Field of Search ............. 414/522, 527, 507, 509, 414/510, 467, 786; 296/35.3, 39.2, 26; 298/15

[56] References Cited

U.S. PATENT DOCUMENTS

| | | | |
|---|---|---|---|
| 952,943 | 3/1910 | Peterson | 298/15 |
| 986,468 | 3/1911 | Kirsch | 414/522 |
| 1,519,852 | 12/1924 | Lindsley | 414/522 |
| 2,470,314 | 5/1949 | Lim | 296/26 |
| 3,084,816 | 4/1963 | Bozio | 414/522 |
| 3,381,835 | 5/1968 | Lee | 414/522 X |
| 4,681,360 | 7/1987 | Peters et al. | 414/522 X |
| 4,681,371 | 7/1987 | Leonard | 414/522 X |

FOREIGN PATENT DOCUMENTS 579619 10/1924 France ..................... 298/15

Primary Examiner—David A. Bucci
Attorney, Agent, or Firm—William J. Ruano

[57] ABSTRACT

A pick-up truck carrying a container or cargo unit having a pair of belts attached to the rear of the container, which belts have extensions which are projected underneath the drive wheels of the vehicle, so that upon backing up of the vehicle, the belt extensions are pulled so as to move the cargo unit rearwardly of the truck.

5 Claims, 2 Drawing Sheets

TRUCK CARGO REMOVER

BACKGROUND OF THE INVENTION

Removing cargo from a truck or cargo unit is a laborious undertaking as well as a time consuming one and no satisfactory way has been devised for easing the effort for removing cargo.

SUMMARY OF THE INVENTION

An object of the invention is to overcome the above-mentioned objection by providing a cargo mover which embodies a pair of wide belts laid alongside the floor of a cargo unit driven by a pair of wheels and projecting the rear extensions of said belts under the respective wheels, whereupon by backing up the truck, the cargo is pulled rearwardly of the cargo unit to facilitate removal thereof.

DESCRIPTION OF THE PREFERRED EMBODIMENTS

Figure 1:
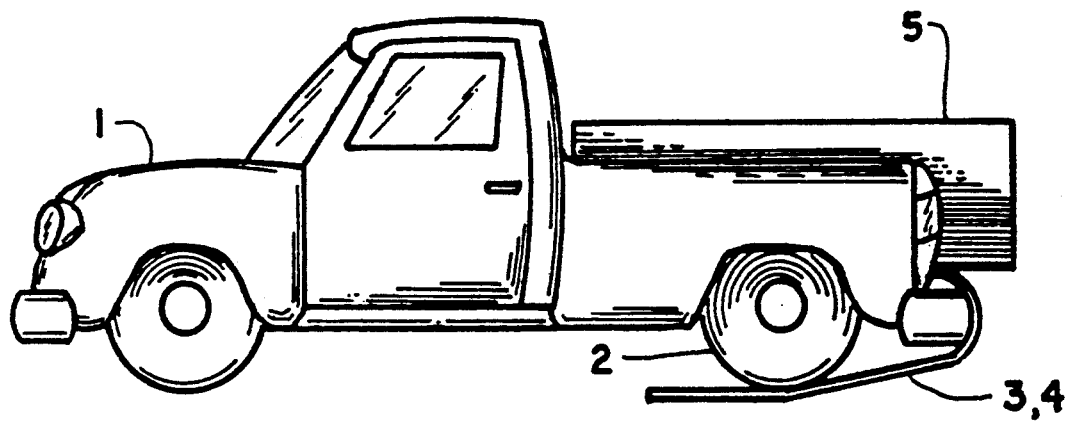
FIG. 1 is a side view of a pick-up truck embodying the present invention.
Figure 2:
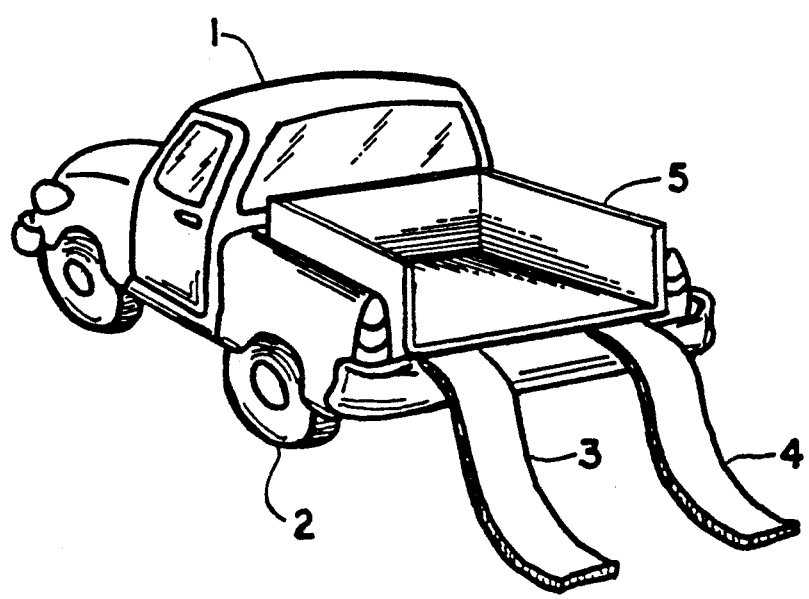
FIG. 2 is a rear perspective view thereof.
Figure 3:
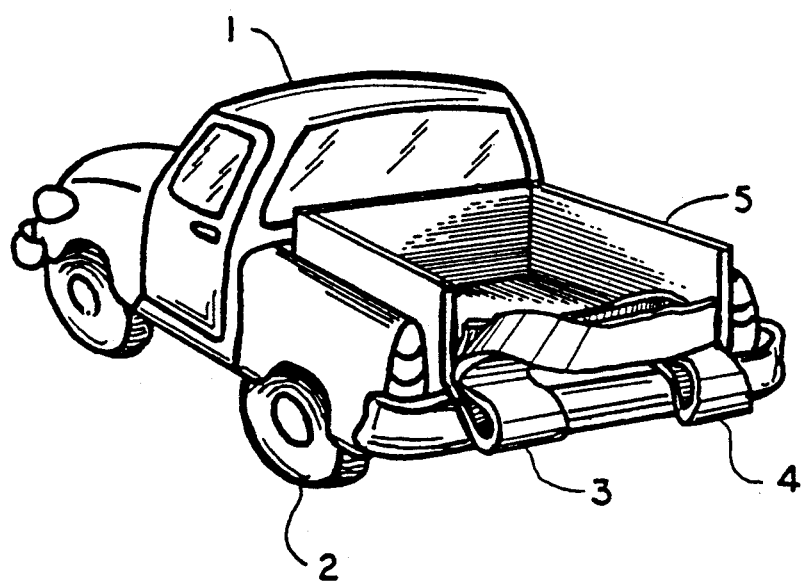
FIG. 3 is a top perspective view showing the belt extensions folded 90° to serve as a tail gate.

Referring to FIGS. 1-3, numeral 1 denotes a pick-up truck having a pair of drive wheels 2. A cargo unit 5 is preferably formed of canvas or strong belting and has attached to its side ends, a pair of belts 3, 4 which are about 12 inch wide and extend about 13 feet in length or the full length to the tail gate plus an additional extension of about 7 feet or which extensions are sufficiently long that their rear ends may be manually projected underneath the rear tires. After use, the extensions may be folded 90° to serve as a tail gate to substitute for the tail gate of the vehicle which has been previously removed. The ends of the extension may have fasteners which fasten to corresponding elements on the vehicle sides.

In operation, as the vehicle is backed up onto the belt extensions, it will pull the cargo unit rearwardly to make the cargo readily accessible at the rear of the vehicle. As the cargo is removed, the vehicle may again be backed up step by step until all the cargo is accessible from the ground.

Figure 4:
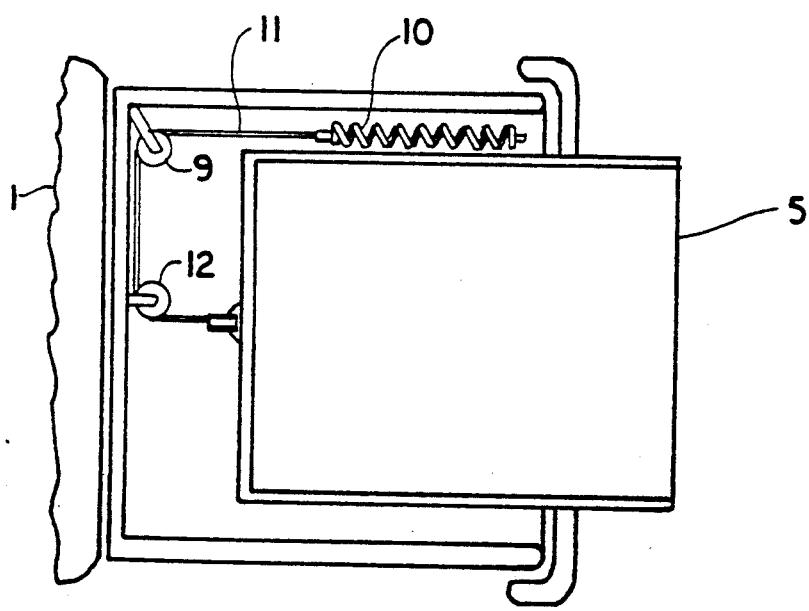
FIG. 4 is a top view.

Then the vehicle is driven forwardly to release the extensions (FIG. 4) from underneath the wheels, whereupon springs 10 will pull on cables 11 entrained over pulleys 9, 12 to return the cargo unit towards the front of the vehicle to its initial position.

As a modification, instead of cargo unit, a mat may be connected between belts 4 to pull any cargo resting on the mat.

While a truck for carrying cargo is shown, it may, instead, be a towed cargo carrying vehicle driven by a four-wheeled truck and operated the same way.

While I have illustrated and described several embodiments of my invention, it will be understood that these are by way of illustration only and that various changes and modifications are contemplated in my invention within the scope of the following claims:

I claim:

1. In combination with a truck body unit having a floor, sides, rear and a pair of wheels, a pair of belts slidably lying on sides of the floor of said truck body unit and having end extensions for projecting beyond said rear of said truck body unit, a cargo supporting unit supported on and attached to said pair of belts, said end extensions of said pair of belts being projectable underneath said pair of wheels so that when the truck is driven rearwardly, said wheels will ride on said extensions and thereby pull said cargo supporting unit towards and beyond the rear of said truck body unit.

2. The combination recited in claim 1 wherein said end extensions are normally turned 90° along the rear of said truck body unit to serve as a tail gate for said truck body unit.

3. The combination recited in claim 1 wherein said end extensions are normally folded over said pair of belts when not in use.

4. In a truck body unit having a floor, sides thereof, a pair of belts slidably lying on sides of said floor of said truck body unit, a cargo unit lying on and attached to said pair of belts, said pair of belts having rear extensions, the method of pulling said cargo unit rearwardly of said truck body unit comprising feeding rear ends of said extensions under drive wheels of said truck body unit and driving said truck body rearwardly over said belt rear extensions so as to pull said cargo unit rearwardly of said truck body unit.

5. The method recited in claim 4 further comprising the steps of providing spring means for pulling said belts into said truck body unit upon driving said truck body unit forwardly.

* * * * *